Patented July 3, 1945

2,379,561

UNITED STATES PATENT OFFICE 2,379,561

METHOD OF INCREASING THE EFFECTIVE PERMEABILITY OF POROUS FORMATIONS

Edwin O. Bennett, Ponca City, Okla., assignor to Continental Oil Company, Ponca City, Okla., a corporation of Delaware No Drawing. Application November 21, 1941, Serial No. 419,914

1 Claim. (Cl. 252—8.55)

My invention relates to a method of increasing the effective permeability of porous formations about the bore of oil and gas wells.

An oil or gas producing formation is frequently in the form of a subterranean strata of sand or porous rock. The oil in the strata must filter therethrough and into the drilled well bore before it can be pumped or flowed to the surface. The passage of the oil through the strata is partially obstructed by the presence of connate water in the formation. Connate water is usually salt water, heavily mineral laden, in the interstices or pores of the strata that has been sealed in by the deposition of overlying beds. This water is quite uniformly distributed throughout most oil producing formations and is found in the form of thin films adhering to the sand grains or formation particles. It may occupy as much as 30 per cent of the pore space. The size of the interstices or pores determines the permeability of the strata and consequently the rate of flow of the oil through the media. Therefore the oil will flow at approximately 60 per cent capacity and it will be readily appreciated that the removal of even a portion of the connate water from the producing zone of the well bore will greatly increase the rate of flow of the oil. The effective permeability of the zone will be greatly increased and the resistance to the flow of oil greatly reduced.

An important object of my invention, therefore, is to provide a method of removing the connate water from the producing zone of an oil or gas well.

Another object of my invention is to provide a method of removing the connate water that will permit a larger percentage of oil or gas to flow into the well bore per unit of time to decrease the quantity of oil that will ultimately have to be lifted by artificial means.

Still another object of my invention is the provision of a method of the above mentioned character that will substantially reduce the ultimate cost of operating the well.

I propose to accomplish these results by injecting fluid into the oil producing formation surrounding the well bore that will absorb the connate water therein. In practice, an absorbent fluid such as alcohol, sulfuric acid, or the like, is pumped into the well and forced into the pores of the formation by any suitable method or apparatus. The injected fluid is characterized by the fact that it has a selective absorption for water and it will therefore absorb the dormant connate water in the portion of the formation immediately surrounding the well bore.

After the water has been absorbed, the solution of fluid and water is flowed or pumped from the well. By reason of the fact that the connate water was introduced into the formation during the geological period when the strata was formed, or entered by seepage during a long period of time thereafter, this water will not be quickly replaced after it is removed. The effective porosity and consequential permeability of the formation is therefore permanently improved by removing the water. I have found that the resistance to flow of the oil from a producing formation may be reduced by 15 to 30 per cent by the absorption and removal of connate water. By materially increasing the rate of flow of the oil, a greater percentage of the oil may be flowed from the well before artificial means for lifting the same must be installed.

While alcohol, sulfuric acid, or other absorbent fluid will materially increase the production capacity of the well, if injected into the producing formation, I have found that the effectiveness of this fluid is greatly increased if a surface tension reducing agent such as an ester of a sulfonated bi-carboxylic acid or a sodium salt of an alkyl naphthalene sulfonic acid is added thereto. The agent increases the effectiveness of the absorbent fluid by reducing the adhesive attraction of the water for the formation particles and permits the fluid to more readily pass therebetween. The absorbent fluid may thus more easily take the water into solution and its ultimate effectiveness is substantially increased.

It is to be understood that where an acid is used, it is not for the purpose of dissolving the formation but rather to absorb the connate water, and its use is not to be confused with "acidizing" a well, as this term is generally understood. The invention is not limited to the use of the absorbent fluids or surface tension reducing agents above named. Any fluid or agent that is effective to produce the intended function is within the scope of my invention.

The apparatus and method employed for introducing the absorbent fluid into the well and for removing the absorbed connate water are those familiar to the art. My invention, as explained, relates to the use of an absorbent fluid alone or mixed with a surface tension reducing agent which combines with the connate water and renders it more readily separable from the granular structure of the oil or gas producing area, and available for removal from the well, leaving the structure more permeable to the ingress and removal of oil and gas.

Having thus described my invention, I claim:

A method of increasing the production of an oil or gas well comprising introducing a water absorbing fluid into the interstices of the producing formation to contact the water adsorbed therein, said water absorbing fluid consisting essentially of sulfuric acid, and withdrawing said water absorbing fluid with the dissolved water from said formation.

EDWIN O. BENNETT.